United States Patent [19]

Tomita et al.

[11] 4,406,068

[45] Sep. 27, 1983

[54] PROBE TRACING METHOD AND MEANS FOR COORDINATE MEASURING MACHINE

[75] Inventors: Yutaka Tomita; Akiro Shibagaki, both of Kanagawa, Japan

[73] Assignee: Mitutoyo Mfg. Co., Ltd., Tokyo, Japan

[21] Appl. No.: 269,888

[22] Filed: Jun. 3, 1981

[30] Foreign Application Priority Data

Jun. 25, 1980 [JP]  Japan ................... 55-86155
Jun. 25, 1980 [JP]  Japan ................... 55-86157

[51] Int. Cl.³ .............................................. G01B 7/03
[52] U.S. Cl. ............................ 33/174 L; 33/174 PC
[58] Field of Search ............... 33/1 M, 169 R, 172 E, 33/174 L, 174 PC

[56] References Cited

U.S. PATENT DOCUMENTS

| 2,835,042 | 5/1958 | Tandler et al. | 33/174 PC |
| 3,226,833 | 1/1966 | Lemelson | 33/174 PC |
| 3,571,934 | 3/1971 | Buck, Sr. | 33/172 E |
| 3,605,909 | 9/1971 | Lemelson | 33/174 PC |
| 3,795,054 | 3/1974 | Kinney | 33/174 PC |
| 4,118,871 | 10/1978 | Kirkham | 33/174 PC |

FOREIGN PATENT DOCUMENTS

| 2298084 | 8/1976 | France | 33/174 L |
| 52-20854 | 2/1977 | Japan | 33/1 M |
| 55-48557 | 4/1980 | Japan | 33/174 L |
| 1599758 | 10/1981 | United Kingdom | 33/1 M |

*Primary Examiner*—Richard R. Stearns
*Attorney, Agent, or Firm*—Koda and Androlia

[57] ABSTRACT

A probe tracing method and apparatus for a coordinate measuring machine including a trace control device in which the probe returns back along almost the same route as the proceeding contact stroke right after the contact with the object to be measured.

4 Claims, 7 Drawing Figures

PROBE TRACING METHOD AND MEANS FOR COORDINATE MEASURING MACHINE

BACKGROUND OF THE INVENTION

1. Field of the Invention

This invention relates to a probe tracing method and means for a coordinate measuring machine, and more particularly to a touch probe which electrically outputs touch signals by means of contacts with an object to be measured.

2. Description of the Prior Art

The coordinate measuring machine is well-known as the machine which accurately measures the external dimension of an object with complicated shape, and is well-known in various industrial fields as a two or three dimension measuring machine.

In FIG. 1 shown therein is a well-known three dimension coordinate measuring machine, and an object to be measured is fixingly held on a bed 10. The size of an object 12 can be measured with high accuracy by reading such coordinate portions of a touch probe 14 that the probe 14 encounters to the external surface of the object to be measured at predetermined measuring points. In order to move and position the touch probe in optional X, Y and Z directions, the measuring machine is provided with an X axial motor 16, a Y axial motor 18 and a Z axial motor 20. A probe tracing device is provided with the motors 16, 18 and 20, and applies trace control signals having each of the speed signals and the directional signal from a trace control means 22 to the motors so that the probe 14 can be moved to predetermined directions to encounter the object 12 at the predetermined measuring points. The touch probe outputs touch signals 100 when it makes contact with the object 12 to be measured. The touch signals 100 are supplied to a signal processing circuit, which is not illustrated, by way of a terminal 24 to read X, Y and Z coordinates at each of the measured portions. Thus, the external size of the object 12 can be measured and recorded. The above mentioned trace control means 22 can be formed with a manual control means wherein an operator inclines a remote control lever toward requested directions to output the voltage change at this time corresponding to trace control value, JOYSTICK for example, or can be formed with an automatic control means outputting predetermined measuring program.

Incidentally, the speed signal consists of pulse signals, and can rotate the motors a certain amount per one pulse. Accordingly, the pulse density during a certain period is proportional to the rotating speed of the motors.

The touch probe 14 used for the coordinate measuring machine described in the above has a displacement mechanism in its contact assembly, and this mechanism prevents the touch probe 14 from destruction in case of movement of the touch probe 14 toward the object to be measured by means of the force of inertia after the touch probe 14 encounters the object 12.

After the touch probe 14 makes contact with the object 12 and completes the measurement, it is controlled to move toward a next measuring point. In a return stroke from the object 12 in the prior art device there is such a problem that the touch probe 14 collides with the object 12. Accordingly, such collision of the touch probe 14 with the object 12 results in deformation, destruction or loss of the expensive touch probe as well as inconvenience since the measuring action must be repeated all over again from the beginning.

In the prior art device illustrated in FIG. 2, particularly, there are found such drawbacks that the touch probe 14 cannot be moved back from the measuring portions in blind locations on the bore portion of the object 12.

The collision of the touch probe 14 with the object 12 in the return stroke mentioned above can be avoided by setting the return stroke to be the same as the proceeding contact stroke. It is, however, extremely difficult in a manual control means wherein the control lever is inclined toward the completely opposite position from the previous inclined position in the contact state of the touch probe 14 to the object 12, and operational error of the control lever frequently causes the collision mentioned in the above. Furthermore, since in the automatic control means in accordance with a predetermined program the tracing control in the actual contact is performed by feedback control with the accompanyment of tracing stroke path drift which changes everytime, it is difficult to completely program such proceeding contact smoke beforehand and it is impossible to establish the return stroke in the same way as the proceeding contact stroke.

SUMMARY OF THE INVENTION

Accordingly, it is a general object of the present invention to provide a probe tracing method and device which firmly prevents destruction, etc. of a touch probe caused by collision with an object to be measured by such a way that an automatic control means establishes a return stroke almost the same as a proceeding contact to have the touch probe to be safely moved back away from a measured point of the object.

In keeping with the principles of the present invention, the object is accomplished with a probe tracing method having such characteristics that, in the probe tracing methods of the coordinate measuring machine which measures the coordinate when the probe moves to make contact with the object to be measured by means of applying to the probe tracing means the trace control signals having at least a speed signal and a direction signal with directions over two dimentions respectively, the probe is applied to trace control signals having the reverse direction signal and the speed signal of substantially same speed with the signals at the time when the probe makes contact with the object to be measured, and returns back along the almost same route as the proceeding contact stroke right after the contact with the object.

In accordance with the present invention the object is also accomplished with a probe tracing means including a return stroke speed command circuit outputting the substantially same speed signal for the return stroke speed signal at the required return stroke amount with the speed signal at the time when the probe makes contact with the object to be measured, an inverting circuit which inverts the direction signal at the time of the contact by the probe, and a return stroke trigger circuit supplying the return stroke trigger signal to the return stroke speed command circuit and the inverting circuit mentioned in the above with the basis of the touch signal from the probe, and having such characteristics that the probe returns back along almost same route as the proceeding contact stroke right after the contact with the object to be measured, in the probe tracing means of the coordinate measuring machine including the trace control device outputting trace control signals having at least the speed signal and the direction signal with directions over two dimensions respectively and the probe tracing means having a motor moving the probe along every axis as the basis of the trace control signals.

In accordance with the present invention, furthermore, the object is accomplished with the probe tracing means of the coordinate measuring machine including the trace control device outputting trace control signals having at least the speed signal and the direction signal with directions over two dimensions respectively and the probe tracing means having the motor moving the probe along every axis as the basis of the trace control signals, including a return stroke speed command circuit having a proceeding contact stroke speed memory circuit which memorizes the proceeding contact stroke speed until the probe makes contact with the object to be measured and outputting the return stroke speed signal in accordance with the above mentioned proceeding contact stroke speed at the return stroke of the probe, an inverting circuit which inverts the direction signal in the memory circuit, and a return stroke trigger circuit supplying the return stroke trigger signal to the return stroke speed command circuit and the inverting circuit as the basis of the touch signals from the probe, and having such characteristics that the probe returns back along almost the same route as the proceeding contact stroke right after the contact with the object to be measured.

BRIEF DESCRIPTION OF THE DRAWINGS

The above mentioned features and objects of the present invention will become more apparent by reference to the following description in conjunction with the accompanying drawings, wherein like referenced numerals denote like elements, and in which.

DETAILED DESCRIPTION OF THE INVENTION

Figure 3:
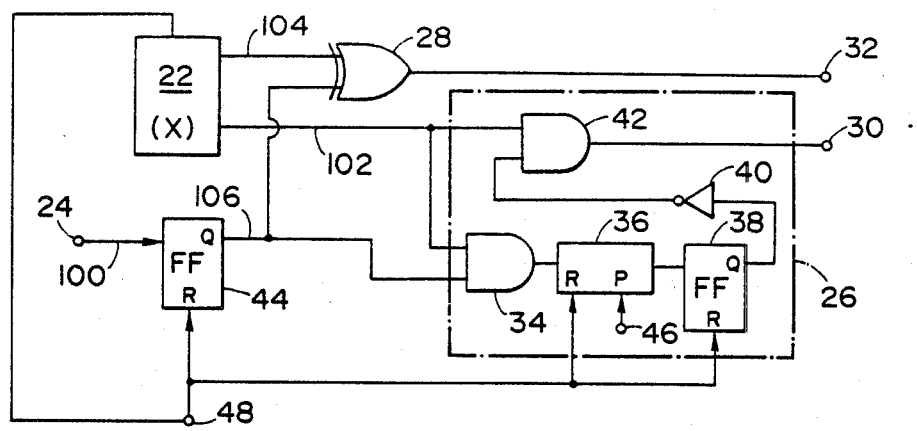
FIG. 3 is a circuit diagram showing the preferred first embodiment of the probe tracing device in accordance with the teachings of the present invention.

Referring more particularly to the drawings, shown in FIG. 3 is a preferred embodiment of a probe tracing means in accordance with the teachings of the present invention, wherein only an X axis tracing means in a three dimension coordinate measuring machine is shown. The other Y axis and Z axis are the same in their circuit compositions, and the description about there composition is omitted.

A speed signal 102 and a direction signal 104 are output from a trace control device 22 of a JOYSTICK, etc. and both of trace control signals 102 and 104 are supplied to an X axis motor 16 of the probe tracing means from terminals 30 and 32 by way of a return stroke speed command circuit 26 and an inverting circuit 28.

The return stroke speed command circuit 26 includes an AND gate 34 which the speed signal 102 is supplied to, a preset counter 36 which starts counting by the output of the AND gate 34, and Flip Flop (referred hereinafter as FF) 38 which is activated by the output of the preset counter 36, and further, Q output of FF 38 is supplied to the one input of AND gate 42 by way of an inverter 40. To the other input of the AND gate 42 is supplied the above mentioned speed signal 102, and its output is outputted as the speed signal 102 from the terminal 30. To the other input of the above mentioned AND gate 34 is supplied a return stroke trigger signal 106 from a return stroke trigger circuit 44 consisting of a FF, and to the preset counter 36 of the return stroke speed command circuit 26 is supplied a predetermined preset value through the input terminal 46. The preset counter 36 supplies its output to the FF 38 when the count value from the AND gate 34 reaches the above mentioned preset value.

On the other hand, the inverting circuit 28 in FIG. 3 consists of an exclusive OR gate and the return stroke trigger signal 106 mentioned in the above is supplied to the other input.

Figure 1:
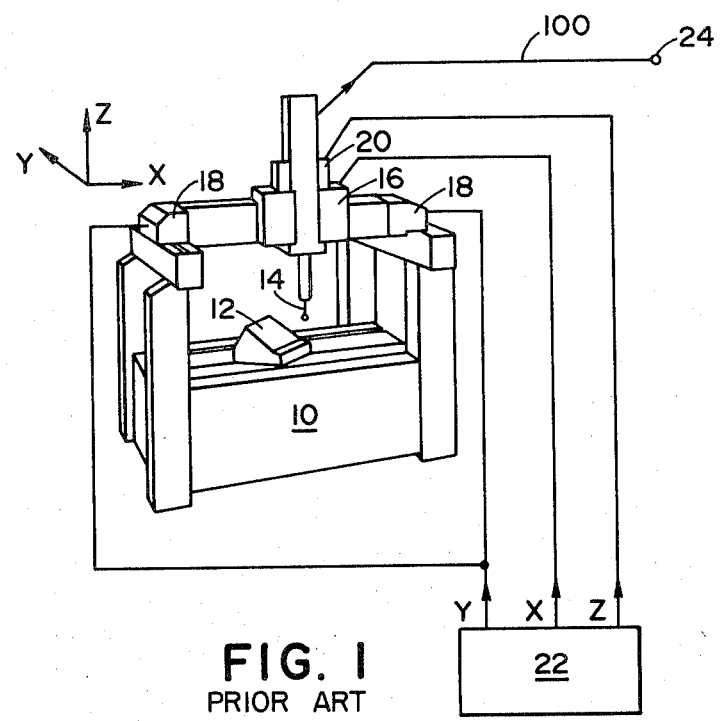
FIG. 1 is a schematic illustration of a general three dimension coordinate measuring machine.
Figure 2:
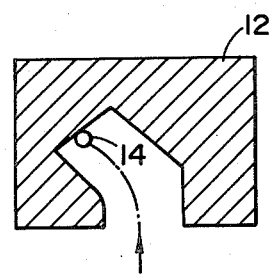
FIG. 2 is an illustration showing one example at a measuring point of the object to be measured.

To the input of the return stroke trigger circuit 44 is supplied a touch signal 100 from the touch probe 14 in FIG. 1 by way of the terminal 24, the return stroke trigger signal 106 is output at the time when the touch signal 100 is applied, that is, when the touch probe 14 makes contact with the object 12 to be measured.

To the reset input of FF 38, 44 and the preset counter 36 in FIG. 3 are supplied reset signals from a terminal 48. In the trace control device 22 using a JOYSTICK in the embodiment the reset input is supplied at the time of zero command when the control lever of the JOYSTICK is released.

The first embodiment is composed as mentioned heretofore, and the action of the present invention is described in the following.

Before commencement of trace command to the probe 14 by the trace control device 22 FF 38, 40 and the preset counter 36 are already in the reset state respectively. Consequently, the AND gate 42 of the return stroke speed command circuit 26 shows "1" at the input from the inverter 40, and the return stroke trigger signal 106 of the one input to the inverting circuit 28 is in the "O" state. In this state, the trace control device 22 outputs the trace control signals of the probe 14, and the speed signal 102 and the direction signal 104 pass through the AND gate 42 and the inverting circuit 28 respectively to drive the probe tracing means in the same way as the prior art device. The probe 14 proceeds towards the predetermined measuring point of the object 12 to be measured via a predetermined proceeding contact stroke.

When the probe 14 makes contact with the object 12 to be measured, stop signals, which are not illustrated, stop the probe tracing means and the touch signal is output at the same time.

The touch signal 100 activates the return stroke trigger circuit 44 and the return stroke trigger signal 106 is supplied to the return stroke speed command circuit 26 and the inverting circuit 28 as "1" signal.

In the return stroke speed command circuit 26, the count start signal is supplied from the AND gate 34 to the preset counter 36 so that the counter 36 can start counting toward the preset value, and the FF 38 is not activated until the counted value of the counter 36 reaches the preset value. Consequently, from the AND gate 42 through the terminal 30 as the return stroke speed signal is supplied the speed signal which has the same speed with the speed signal 102 output from the trace control device 22 at the time when the probe 14 makes contact with the object 12 to be measured.

On the other hand, the inverting circuit 28 can invert the direction signal 104 at the time of the probe contact by means of applying the return stroke trigger signal 106.

Accordingly, after the probe makes contact, to the probe tracing means are supplied the substantially same speed signal as the one at the time of the contact and the direction signal in which the direction is inverted, and the probe 14 moves back away from the object 12 to be measured along almost same way as the proceeding contact stroke. This return stroke amount is determined by the preset value of the preset counter 36. In other words, the counter 36 counts the required numbers of the speed signal 102 to reach the preset value, and supplies the activating signal to the FF 38. Consequently, the Q output of the FF 38 becomes "1", and "0" signal is supplied to the AND gate 42 by way of the inverter 40 to halt the output of the return stroke speed signal from the terminal 30.

As mentioned in the above, according to the first embodiment, the probe 14 can move back away along the same route as the proceeding contact stroke to the object 12 at the speed corresponding to the speed signal 102 which is outputted from the trace control device 22 right after the contact with the object 12 to be measured, and it is understood that the return stroke amount can be established by the predetermined return stroke amount in the preset counter, that is, the amount at which the probe 14 can move back away from the object 12 to be measured with enough safety. In the first embodiment, the trace control device 22 consists of a JOYSTICK, etc., and the speed signal 102 is determined by the amount incline of its control lever, and in the return stroke mentioned in the above the inclined position of the control lever at the time when the probe 14 makes contact with the object 12 to be measured determines the speed signal. In other words, the probe 14 can move back away from the object 12 at substantially same speed signal as the speed signal at the time proceeding the contact stroke. In ordinary cases, within the time of return stroke, 0.1 second for example, the inclined portion of the control lever of the JOYSTICK is held at almost same value, and, in the first embodiment, the probe 14 can move back away from the object 12 in the same way as the proceeding contact stroke. Since this return stroke amount is determined by only the preset value of the presetcounter 36, the time of return stroke corresponds to the speed of the probe 14 at the contact. The fast speed shortens the time of the return stroke, and, on the other hand, the slow speed makes the time of the return stroke longer, but the return stroke amount, that is, the distance has a fixed amount determined by the preset value. In the embodiment, the preset value of the preset counter 36 is optionally adjusted by the established signal at the preset input terminal 46 and the return stroke amount can be established at the most suitable return stroke amount corresponding to measuring conditions.

After the completion of the return stroke, in other words, when the control lever of the JOYSTICK is released in the embodiment, the reset signal is supplied from the terminal 48 to reset it to the initial state, and the trace control signals are effectively applied from the trace control device 22 to the probe tracing means.

Figure 4:
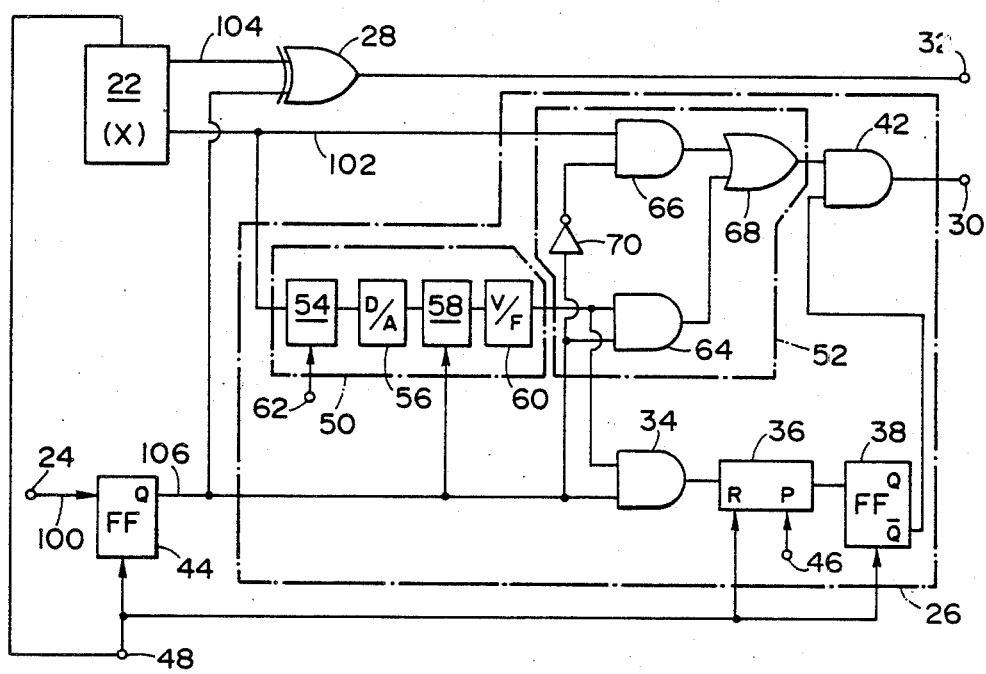
FIG. 4 is a circuit diagram showing the second embodiment.

In FIG. 4 shown therein is the second preferred embodiment, wherein like elements are denoted by like referenced numerals as FIG. 3 and their description is omitted.

In the second embodiment, the return stroke speed command circuit memorizes the value of the speed signal 102 at the time of the contact by the probe 14 and it is characterized that the return stroke speed signal is output a the basis of this memorized value. In order for the above mentioned, in the return stroke speed command circuit 26, there are installed a proceeding contact stroke speed command memory circuit 50 and a switch circuit 52. The proceeding contact stroke speed command memory circuit 50 includes a sampling counter 54 which samples the speed command 102, a D/A converter 56 which converts the counted value in the sampling counter 54 into an analog signal, an analog memory 58 which memorizes the analog value of the D/A converter 56, and a V/F converter 60 which converts the voltage value in the analog memory 58 into pulse signals. To the sampling counter 54 are supplied sampling pulses by way of a terminal 62 and the speed signal 102 is counted every required sampling cycle. The analog signal corresponding to this digital signal is supplied from the D/A counter 56 to the analog memory 58, and the memory contents of the analog memory 58 is held by applying the return stroke trigger signal 106 at the time of contact by the probe. Furthermore, the analog value holdingly memorized in the analog memory 58 is converted into pulse signals in the V/F counter 60 and applied to an AND gate 64 of the switch circuit 52 mentioned in the above. The speed signal at the time of the contact by the probe is continuously outputted and holds the speed signal at the time of the contact by the probe without any change when the speed signal 102 of the trace control device changes in the return stroke of the probe 14. The return stroke amount can be established longer of necessity.

The switch circuit 52 includes AND gates 64 and 66 in which the speed signal 102 of the output from the trace control device 22 is applied, an OR gate 68 to which the outputs of the AND gates 64 and 66 are applied, and an inverter 70 which inverts the return stroke trigger signal 106 and supplies it to the AND gate 66.

The second embodiment of the present invention is composed as mentioned in the above and its action is described in the following.

The basic operation of the second embodiment is same as the first embodiment and is different in the switch action between the speed signal 102 and the return stroke speed signal of the output from the proceeding contact stroke speed command memory circuit 50 mentioned in the above. The return stroke trigger signal 106 at the time of the contact by the probe is applied to the switch circuit 52 to close the AND gate 66 and to open the AND gate 64, and the switch circuit 52 outputs the return stroke speed signal from the proceeding contact stroke speed command memory circuit 50 through the terminal 30.

Figure 5:
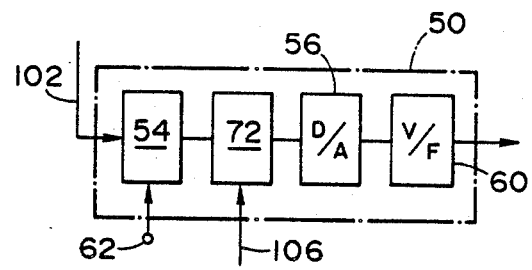
FIGS. 5 and 6 are circuit diagrams showing another embodiment of speed command memory circuit in FIG. 3 at the time of contact.

According to the second embodiment, even if an extra-ordinary speed command signal 102 is outputted from the trace control device 22 after the contact by the probe, it is possible to make the return stroke and the proceeding contact stroke to the object substantially identical. In FIG. 5 shown therein is another embodiment of the proceeding contact stroke speed command memory circuit 50 in the second embodiment. It is characterized in that the output from the sampling counter 54 is holdingly memorized at the time of the contact by the probe by the digital memory 72 and this digital value is converted into an analog signal to be further converted into pulse signals. The basic circuit operation, however, is same as the operation in FIG. 4.

Figure 6:
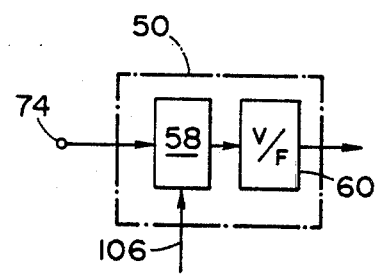

In FIG. 6 shown therein is another embodiment of the proceeding contact stroke speed command memory circuit 50 in the second embodiment. It is characterized that the command voltage of the JOYSTICK is directly supplied to the analog memory 58 through the terminal 74 and this analog signal is converted into pulse signals, and the extremely simplified circuit can be provided in case of using the JOYSTICK as the trace control device 22.

Figure 7:
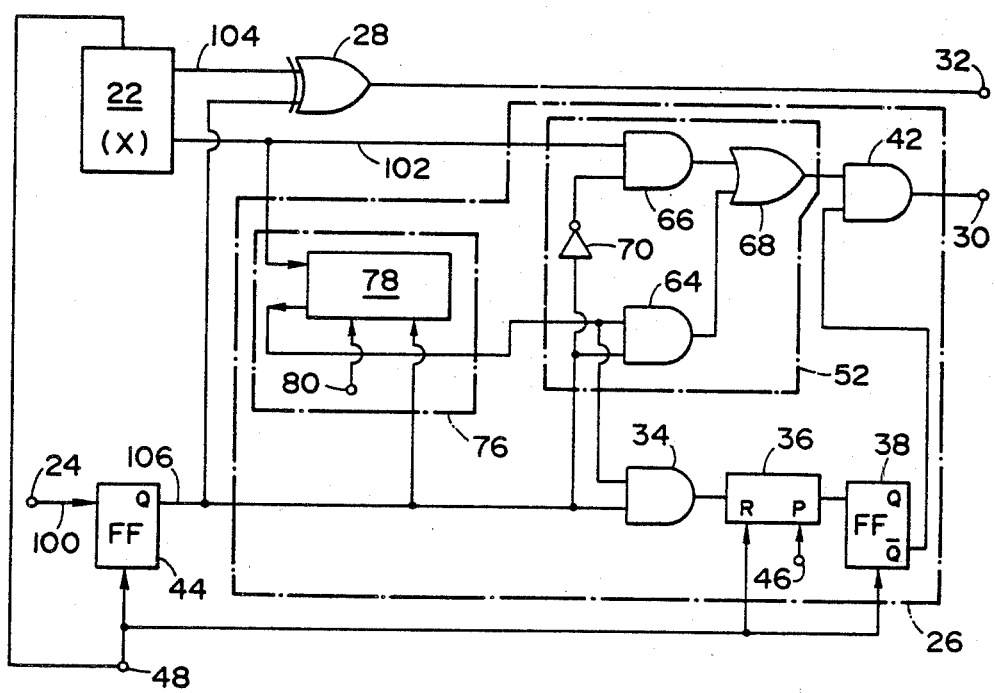
FIG. 7 is a circuit diagram showing the third embodiment of the present invention.

In FIG. 7 shown therein is the third embodiment of the present invention. The return stroke speed command circuit 26 includes a proceeding contact stroke speed memory circuit 76 which memorizes the proceeding contact speed at the access route in case such proceeding contact stroke is not straight and outputs the return stroke speed signal based on such memory. The proceeding contact stroke speed memory circuit 76 includes a shift resister 78 which can read a certain amount of the speed signal 102 by means of the clock signals from the clock input 80 and such reading contents are renewed one after another. To the reading and writing input of the shift resister 78 is applied the return stroke trigger signal 106 and the return stroke trigger signal 106 reads out the contents of the shift resister 78.

In the third embodiment, to the shift resister 78 the proceeding contact stroke speed at the time of the contact by the probe is read into the shift resister 78 one after another and the contents of the shift resister 78 is read out from the firstly read-in side one after another to the switch circuit 52 as the return stroke speed signal. This return stroke signal, therefore, becomes the return stroke signal being read out as the proceeding contact stroke one after another in the reverse way from the time of the contact by the probe and the return stroke can be provided in the same way as the proceeding contact stroke to the object to be measured.

According to the third embodiment, the return stroke can be established identically as the proceeding contact stroke and the measuring point can be easily determined to an object to be measured with complicated shape.

As described heretofore, according to the present invention, the return stroke after the contact and the proceeding contact stroke to the object to be measured can be substantially provided identical and the probe can be automatically moved back away from the object to be measured with safety, which can firmly prevent the probe from damage and other accidents.

What is claimed is:

1. A probe tracing method for a coordinate measuring machine of the type including a probe tracing means, a trace control device and a means for varying the trace control signals, said method comprising the steps of: applying to said probe tracing means of the coordinate measuring machine trace control signals to move the probe tracing means to make contact with an object to be measured, said trace control signals including at least a two-dimensional speed signal and at least a two-dimensional direction signal and which varies the speed and direction signals as said probe approaches said object to be measured; and applying to the probe tracing means trace control signals including a reverse of the direction signal and the speed signal of substantially the same speed at the time when the probe makes contact with the object to be measured to return the probe tracing means back along substantially the same route as the proceeding contact stroke right after contact with the object to be measured.

2. A coordinate measuring machine including a trace control device outputting trace control signals including at least a two-dimensional speed signal and at least a two-dimensional direction signal, a probe tracing means including a motor for moving the probe along every axis in response to the trace control signals and a means for varying the speed and direction signals as said probe approaches said object to be measured, said probe tracing means for the coordinate measuring machine comprising:

a return stroke speed command circuit outputting substantially the same speed signal for a return stroke speed signal as the speed signal at the time when the probe makes contact with the object to be measured;

an inverting circuit which inverts the direction signal at the time of the contact by the probe; and a return stroke trigger circuit for applying a return stroke trigger signal to said return stroke speed command circuit when said probe contacts said object to be measured;

whereby the probe returns back along substantially the same route as a proceeding contact stroke right after contact with the object to be measured.

3. A coordinate measuring machine including a trace control device outputting trace control signals having at least a two-dimensional speed signal and at least a two-dimensional direction signal, a probe tracing means including a motor for moving the probe along every axis in response to the trace control signals and a means for varying the speed and direction signals as the probe approaches the object to be measured, said probe tracing means for a coordinate measuring machine comprising:

a return stroke speed command circuit having a proceeding contact stroke speed memory circuit which memorizes a proceeding contact stroke speed until the probe makes contact with the object to be measured and for outputting a return stroke speed signal in accordance with the proceeding contact speed at the return stroke of the probe;

an inverting circuit which inverts the direction signal in the memory circuit; and a return stroke trigger circuit supplying a return stroke trigger signal to said return stroke speed command circuit when said probe contacts with said object to be measured;

whereby the probe returns back along substantially the same route as the proceeding contact stroke right after contact with the object to be measured.

4. A probe tracing means for a coordinate measuring machine according to claim 3 wherein said proceeding contact stroke speed memory circuit comprises a shift resister which can read written data.

* * * * *